(12) United States Patent
Erkey et al.

(10) Patent No.: US 7,378,450 B2
(45) Date of Patent: May 27, 2008

(54) AEROGEL AND METALLIC COMPOSITIONS

(75) Inventors: Can Erkey, South Windsor, CT (US); Hiroaki S. Hara, West Hartford, CT (US)

(73) Assignee: University of Connecticut, Farmington, CT (US)

( * ) Notice: Subject to any disclaimer, the term of this patent is extended or adjusted under 35 U.S.C. 154(b) by 350 days.

(21) Appl. No.: 10/327,300

(22) Filed: Dec. 20, 2002

(65) Prior Publication Data

US 2004/0029982 A1 Feb. 12, 2004

Related U.S. Application Data

(60) Provisional application No. 60/343,700, filed on Dec. 27, 2001, provisional application No. 60/390,174, filed on Jun. 19, 2002, provisional application No. 60/412,755, filed on Sep. 23, 2002.

(51) Int. Cl.
*C09K 3/00* (2006.01)
*B01J 23/42* (2006.01)
*B01J 35/10* (2006.01)

(52) U.S. Cl. .................. 516/98; 502/184; 502/185; 429/40; 429/44

(58) Field of Classification Search .......... 516/98; 502/184, 185; 429/40, 44
See application file for complete search history.

(56) References Cited

U.S. PATENT DOCUMENTS

| | | | |
|---|---|---|---|
| 4,044,193 A | 8/1977 | Petrow et al. | 429/40 |
| 4,447,505 A | 5/1984 | Blanchart | 429/42 |
| 4,469,816 A | 9/1984 | Armor et al. | 502/333 |
| 4,614,692 A | 9/1986 | Kajiyama et al. | 429/44 |
| 4,832,881 A | 5/1989 | Arnold et al. | 264/29.7 |
| 5,260,855 A | 11/1993 | Kaschmitter et al. | 361/502 |
| 5,358,802 A | 10/1994 | Mayer et al. | 429/218 |
| 5,366,828 A | 11/1994 | Struthers | 429/101 |
| 5,395,705 A | 3/1995 | Door et al. | 429/42 |
| 5,425,858 A | 6/1995 | Farmer | 204/149 |
| 5,453,169 A | 9/1995 | Callstrom et al. | 204/242 |
| 5,455,999 A | 10/1995 | Weiss et al. | 29/623.1 |
| 5,476,878 A | 12/1995 | Pekala | 521/61 |
| 5,529,971 A | 6/1996 | Kaschmitter et al. | 502/416 |
| 5,601,938 A | 2/1997 | Mayer et al. | 429/40 |
| 5,607,785 A | 3/1997 | Tozawa et al. | 429/33 |
| 5,626,977 A | 5/1997 | Mayer et al. | 429/44 |
| 5,744,510 A | 4/1998 | Pekala | 521/181 |
| 5,789,027 A | 8/1998 | Watkins et al. | 427/250 |
| 5,851,947 A * | 12/1998 | Hair et al. | 502/258 |
| 5,879,744 A | 3/1999 | Cao et al. | 427/248.1 |
| 6,005,012 A | 12/1999 | Hrubesh et al. | 521/53 |
| 6,010,798 A | 1/2000 | Hammerschmidt et al. | 429/30 |
| 6,426,115 B1 | 7/2002 | Sunol | 427/217 |
| 6,426,116 B1 | 7/2002 | Sunol | |
| 6,440,495 B1 | 8/2002 | Wade et al. | 427/250 |
| 6,569,358 B1 * | 5/2003 | Tai et al. | 252/512 |
| 6,809,060 B2 * | 10/2004 | Suh et al. | 502/185 |
| 6,958,308 B2 | 10/2005 | Brown | |
| 7,247,259 B2 | 7/2007 | Erkey et al. | |
| 2003/0064265 A1 * | 4/2003 | Hampden-Smith et al. | 502/185 |
| 2003/0176277 A1 | 9/2003 | Suh et al. | 502/180 |
| 2003/0198849 A1 | 10/2003 | Hampden-Smith et al. | 429/30 |
| 2004/0141908 A1 * | 7/2004 | Hara et al. | 423/445 R |

FOREIGN PATENT DOCUMENTS

| | | |
|---|---|---|
| JP | 56-009970 | 1/1981 |
| JP | 56-079858 | 6/1981 |
| JP | 57-005266 | 1/1982 |
| JP | 58-054563 | 3/1983 |
| JP | 59-073860 | 4/1984 |
| JP | 59-127372 | 7/1984 |
| JP | 60-065466 | 4/1985 |
| JP | 60-070668 | 4/1985 |
| JP | 60-077360 | 5/1985 |
| JP | 60-133659 | 7/1985 |
| JP | 60-133662 | 7/1985 |
| JP | 61-039367 | 2/1986 |
| JP | 62-051166 | 3/1987 |
| JP | 62-217352 | 11/1987 |
| JP | 02-226659 | 9/1990 |
| JP | 04-118857 | 4/1992 |
| JP | 08-022827 | 1/1996 |
| JP | 11-003715 | 6/1999 |

(Continued)

OTHER PUBLICATIONS

"A new electrocatalyst consisting of a molecularly homogeneous plantinm-aerogel nanocomposite", Can J. Chem. 75:1666-1673 (1997) by Ye et al, month unknown.

"Deposition of Ruthenium Nanoparticles on Carbon Aerogels for High Energy Density Supercapacitor Electrodes", Electrochemical Society Letters, vol. 144, No. 12, Dec. 1997 by Miller et al.

"Carbon aerogels for electrochemical applications", Journal of Non-Crystalline Solids 225 (1998) 74-80 by Pekala, et al. (1998), month unknown.

(Continued)

*Primary Examiner*—Daniel S. Metzmaier
(74) *Attorney, Agent, or Firm*—McCormick, Paulding & Huber LLP

(57) ABSTRACT

Metallic aerogel compositions comprising an aerogel, e.g., RF or carbon aerogel, having metallic particles dispersed on its surface are disclosed. The aerogel compositions can have a uniform distribution of small metallic particles, e.g., 1 nanometer average particle diameter. Also disclosed are processes for making the aerogel compositions comprising contacting an aerogel with a supercritical fluid containing a metallic compound. The aerogel compositions are useful, for example in the manufacture of fuel cell electrodes.

2 Claims, No Drawings

FOREIGN PATENT DOCUMENTS

| | | |
|---|---|---|
| JP | 2000-106194 | 4/2000 |
| JP | 2000-164224 | 6/2000 |
| JP | 2001-89129 | 4/2001 |
| WO | WO 97/16245 | 5/1997 |
| WO | WO 00/47319 | 8/2000 |
| WO | WO 03/057367 A2 | 7/2003 |

OTHER PUBLICATIONS

"Aerogel composites using chemical vapor infiltration", Journal of Non-Crystalline Solids 185 (1995) 227-232 by Hunt, et al. (1994), month unknown.

"Synthesis and textural characteristics of organic aerogels, transmtion-metal containing organic aerogels and their carbonized derivatives", Carbon 37 (1999) 1199-1205 by Maldonado-Hodar et al., month unknown.

"Morphology and Electrochemistry of Ruthenium/Carbon Aerogel Nanostructures", Langmuir 1999, 15,799-806 by Miller and Dunn, month unknown.

"Monolithic carbon aerogels for fuel cell electrodes", Preparation of Catalysts VII. 1998, 167 by Pajonk et al. (1997), month unknown.

"Microporous Nature of Ce,Zr-Doped Carbon Aerogels", Langmuir 1999, 15 7119-7121 by Bekyarova, et al. (1999), month unknown.

"Metal-carbon aerogels as catalysts and catalyst supports", Studies in Surface Science and Catalysis (2000), 130, 1007 by Maldonado-Hodar et al, month unknown.

"Catalytic Graphitization of Carbon Aerogels by Transition Metals", Langmuir, 2000, 16, 4367-4373 by Maldonado-Hodar et al, month unknown.

"Integration of carbon aerogels in PEM fuel cells", Journal of Non-Crystalline Solids 285 (2001) 283-287 by Glora et al. (2001), month unknown.

International Search Report of PCT/US02/41205, Sep. 2004.

International Search Report for Serial No. PCT/US2004/033082 dated Dec. 7, 2005.

Article entitled "Polymer/Metal Nanocomposite Synthesis in Supercritical CO2" by Watkins et al., Chemistry of Materials, vol. 7, No. 11, Nov. 1995, 3 pages.

Webpae entitled "Types of Fuel Cells", Fuel Cells 2000, www.fuelcells.org, The Online Fuel Cell Information Center, http://web.archive.org/web/20021211024857/http:/www.fuelcells.or . . . ; 5 pages, (Nov.-2007).

\* cited by examiner

AEROGEL AND METALLIC COMPOSITIONS

This application claims priority of the following patent applications: U.S. Ser. No. 60/343,700, filed on Dec. 27, 2001, U.S. Ser. No. 60/390,174, filed on Jun. 19, 2002 and U.S. Ser. No. 60/412,755, filed on Sep. 23, 2002.

FIELD OF THE INVENTION

The present invention generally relates to aerogel compositions and more specifically to aerogels having metallic particles dispersed therein, e.g, carbon aerogels loaded with platinum, and their preparation.

BACKGROUND OF THE INVENTION

Aerogels are porous materials that are produced by polycondensation reactions known in the art as the "sol-gel process". A common feature among aerogels is their small inter-connected pores. The aerogel chemical composition, microstructure and physical properties can be controlled at the nanometer scale due to sol-gel processing. There are three major types of aerogels—inorganic, organic and carbon aerogels. Inorganic aerogels can be obtained by supercritical drying of highly cross-linked and transparent hydrogels synthesized by polycondensation of metal alkoxides. Silica aerogels are the most well known inorganic aerogels. Organic aerogels can be synthesized by supercritical drying of the gels obtained by the sol-gel polycondensation reaction of monomers such as, for example, resorcinol with formaldehyde, in aqueous solutions. Carbon aerogels can be obtained by pyrolyzing the organic aerogels at elevated temperatures.

Aerogels, e.g., carbon aerogels (also referred to in the art as carbon foams) have been produced by various methods for a variety of applications. These prior processes are exemplified by U.S. Pat. No. 4,806,290 issued Feb. 21, 1989; U.S. Pat. No. 4,873,218 issued Oct. 10, 1989; U.S. Pat. No. 4,997,804 issued Mar. 5, 1991; U.S. Pat. No. 5,086,085 issued Feb. 4, 1992; and U.S. Pat. No. 5,252,620 issued Oct. 12, 1993. Typically, efforts have been directed to the development of carbon aerogels for use as electrodes and include all forms of carbon aerogels, monolithic, granular or microspheres. Such electrodes find use, for example, in energy storage devices, e.g., capacitors and batteries, as well as for fuel cells, e.g., proton exchange membrane ("PEM") fuel cells and electrocapacitive deionization devices, etc. These efforts are exemplified by U.S. Pat. No. 5,260,855 issued Nov. 9, 1993; U.S. Pat. No. 5,529,971 issued Jun. 25, 1996; U.S. Pat. No. 5,420,168 issued May 20, 1995; U.S. Pat. No. 5,508,341 issued Apr. 16, 1996; and U.S. Pat. No. 6,010,798, issued Jan. 4, 2000.

Additives can be incorporated into aerogels to make aerogel compositions (also referred to herein as "aerogel composites"). The role of the additives is to enhance the properties of pure aerogels or to impart additional desirable properties depending on the application. In general, aerogel composites are typically prepared using two different methods. The first one involves adding the additive to the sol prior to polymerization and the second method involves contacting the produced aerogel with a liquid or gaseous stream containing the additive.

Ye et al., Can. J. Chem. 75:1666-1673 (1997) disclose the preparation of polyacrylonitrile/platinum aerogel composites by dipping carbonized polyacrylonitrile ("PAN") aerogels in hexachloroplatinic ($H_2PtCl_6$) solution. The precursor ($H_2PtCl_6$) was added prior to the gelatin stage. It is disclosed that incorporating the platinum precursor before the gelatin stage resulted in a more homogeneous distribution of platinum.

Pajonk et al., Preparation of Catalysts VII, 1998, 167 (1997), disclose a method to make carbon aerogels and load platinum onto the aerogels, whereby resorcinol-formaldehyde ("RF") aerogels were obtained by polymerization in acetone instead of water and perchloric acid was used as the catalyst. After curing and supercritical extraction of acetone, the samples were pyrolyzed. Subsequently, the samples were impregnated with $H_2PtCl_6$ in acetone. Then, acetone was supercritically extracted and the sample was calcined and reduced with hydrogen. The dispersion of platinum was reported to be 23% and the platinum content was reported to be 0.44 wt %.

U.S. Pat. No. 5,851,947, issued Dec. 22, 1998, discloses a method for incorporating noble metals into inorganic aerogels. The metal precursors were added to the sol. After gelatin, the ethanol was removed by supercritical drying.

Miller et al., J. Electrochem Soc., 144 (No. 12) (1997); Lanngmuir 15:799-806 (1999) disclose the deposition of ruthenium nanoparticles on carbon aerogels. Carbon aerogels were prepared and impregnated with ruthenium 2,4 pentanedionate by chemical vapor impregnation.

Maldonado-Hodar et al., Carbon 37, 1199-1205 (1999), disclose a series of carbon aerogels containing Pt, Pd and Ag. $Pt(NH_3)_4Cl_2$, $PdCl_2$ and $Ag(CH_3COO)$ were used as the polymerization catalyst in the initial solution for preparation of RF aerogels. After curing, water was exchanged with acetone and acetone was extracted by supercritical carbon dioxide. Subsequently, the aerogels were pyrolyzed in flowing nitrogen.

U.S. Pat. No. 5,789,027, issued Aug. 4, 1998, discloses methods for depositing a film of material on the surface of a substrate by i) dissolving a precursor of the material into a supercritical or near-supercritical solvent to form a supercritical or near-supercritical solution; ii) exposing the substrate to the solution, under conditions at which the precursor is stable in the solution; and iii) mixing a reaction reagent into the solution under conditions that initiate a chemical reaction involving the precursor, thereby depositing the material onto the solid substrate, while maintaining supercritical or near-supercritical conditions. The patent also discloses similar methods for depositing material particles into porous solids, and films of materials on substrates or porous solids having material particles deposited in them.

Processes such as described above often have inadequate control over the manner in which the metallic particles are incorporated, thereby providing aerogel compositions having inconsistent metal particle sizes and broad particle size distributions. This has been one of the factors which have inhibited the commercialization of aerogels, particularly for use in PEM fuel cells which currently require large amount of platinum to obtain an acceptable level of performance. Decreasing the amount of platinum used in fuel cells would be beneficial for fuel cell based power generation systems to compete with internal combustion engines.

Accordingly, aerogel compositions comprising aerogels having metallic particles, e.g., platinum, dispersed within, and processes for making such aerogels, are desired. Desirably, such aerogel compositions would contain metal particles having a small particle size, e.g., 4 nanometers or less, with a narrow particle size distribution.

SUMMARY OF THE INVENTION

In accordance with the present invention, aerogel compositions comprising an aerogel having metallic particles dispersed on the surface of the aerogel, i.e., in the pores, wherein the metallic particles have an average particle size of about 4 nanometers or less, based on the number of metallic particles. Typically, the average particle size of the metallic particles is about 3 nanometers or less, preferably from 1 to 2 nanometers and more preferably about 1 nanometer.

Quite surprisingly in accordance with the present invention, it has been found that the aerogel compositions can have a very narrow particle size distribution of the metallic particles. Typically, when the metallic particles have an average particle size of about 4 nanometers or less, less than about 20% of the metallic particles have a particle size of about 5 nanometers or greater, based on the number of metallic particles. Typically, when the metallic particles have an average particle size of about 3 nanometers, less than about 20% of the metallic particles have a particle size of about 4 nanometers or greater and less than about 20% of the metallic particles have a particle size of about 2 nanometers or less. Typically, when the metallic particles have an average particle size of about 2 nanometers, less than about 20% of the metallic particles have a particle size of about 3 nanometers or greater and less than about 20% of the metallic particles have a particle size of about 1 nanometer or less. Preferably, less than about 20% of the metallic particles have a particle size of about 3 nanometers or greater and less than about 20% of the particles have a particle size of less than about 1 nanometer. More preferably, when the metallic particles have an average particle size of about 1 nanometer, less than about 20% of the metallic particles have a particle size of about 2 nanometers or greater and less than about 20% of the metallic particles have a particle size of less than about 1 nanometer, based on the number of metallic particles.

By virtue of the present invention, it is now possible to utilize less metal, e.g., platinum, in the aerogel compositions than used in conventional aerogel compositions, and still provide equivalent or enhanced performance in catalytic applications, e.g., PEM fuel cells.

Further in accordance with the present invention, there are provided processes for making metallic aerogel compositions, comprising contacting an aerogel with a supercritical fluid comprising a metallic compound, e.g., an organometallic compound. Quite advantageously, the metallic compound can be incorporated into the aerogel at various times during the manufacturing. For example, the metallic compound can be incorporated after the supercritical extraction of the liquid polymerization medium, e.g., water from the cured aerogel (also referred to as the "cured hydrogel"). Alternatively, the metallic compound can be incorporated into the aerogel after pyrolysis. Additionally, the polymerization can be conducted in the presence of the metallic compound.

DETAILED DESCRIPTION OF THE INVENTION

The particular aerogel used in the compositions of the present invention is not critical. For example, the aerogels can be organic, e.g., RF aerogels, or inorganic, e.g., silica aerogels. Further, organic aerogels can be pyrolyzed to form carbon aerogels. As used herein, the term "aerogel" includes all aerogel forms, i.e., inorganic aerogels, organic aerogels, carbon aerogels and aerogels (gels formed when hydrogels are air dried instead of supercritically dried)

Likewise, the particular precursors used to make the aerogels are not critical. Typical precursors used to make silica aerogels, for example, include tetramethyl orthosilicate (TMOS, $Si(OCH_3)_4$), and tetraethyl orthosilicate (TEOS, $Si(OCH_2CH_3)_4$). Other precursors can be selected by those skilled in art to make other inorganic aerogels containing oxides such as silica, alumina, titania, vanadia, niobia, zirconia, tantala, or mixtures thereof. Examples of precursors, i.e., monomers, used to make organic aerogels include include resorcinol, phenol, catechol, chloroglucinol, and other polyhydroxybenzene compounds that react in the appropriate ratio with formaldehyde or furfural, e.g., resorcinol-furfural, resorcinol-formaldehyde, phenol-resorcinol-formaldehyde, catechol-formaldehyde, and chloroglucinol-formaldehyde. Further details concerning the selection of suitable precursors to make the desired aerogels are known to those skilled in the art. Such materials are commercially available.

The particular method for producing the aerogels is not critical to the present invention. Organic aerogels are typically produced as follows. The process in general requires first that the reactants, i.e., monomers, are mixed with a catalyst and may include the addition of metals. A gel formed by polymerization is then dried in a solvent exchange and extraction step. The resulting organic aerogel is then pyrolyzed in an inert atmosphere to form a carbon aerogel. Specifically, the process to prepare the gels proceeds through a sol-gel polymerization of certain multifunctional organic monomers in a solvent, typically water, leading to the formation of highly cross-linked, transparent gels ("hydrogel sol"). For example, in a preferred aspect of the invention, one mole of resorcinol (1,3-dihydroxybenzene) condenses in the presence of a basic catalyst with two moles of formaldehyde. Mildly basic catalysts such as sodium carbonate are preferred. In this polymerization, resorcinol is a trifunctional monomer capable of adding formaldehyde in the 2-, 4-, and/or 6-ring positions. The substituted resorcinol rings condense with each other to form nanometer-sized clusters in solution. Eventually, the clusters crosslink through their surface groups (e.g., —$CH_2$ OH) to form the hydrogel sol. Further details of the reaction are known in the art, e.g. see U.S. Pat. Nos. 4,997,804 and 4,873,218. Other patents which describe the preparation of aerogels include U.S. Pat. Nos. 6,432,886, 6,364,953, 6,307,116, 5,908,896, 5,879,744, 5,851,947 and 5,306,555.

The size of the clusters can be regulated by the concentration of catalyst in the resorcinol-formaldehyde (RF) mixture. More specifically, the mole ratio of resorcinol (R) to catalyst (C), R/C, controls the surface area and electrochemical properties of the resulting gel. Preferably, in accordance with the present invention, the R/C ratio is from about 50 to 300. Other commonly referenced ratios include resorcinol (R) to formaldehyde (F), R/F and resorcinol (R) to water (W), R/W. Typically, the R/F and R/W molar ratios are in the range of about 0.01 to 10.

Then, the hydrogel sol is typically cured for a time and temperature sufficient to stabilize the aerogel structure and form a cured hydrogel. Typical curing times range from 2 hours to 5 days, or more. Typical curing temperatures range from 25 C. to 150 C. Pressures greater than 1 atmosphere ("atm") can be used if desired to decrease the curing time. After curing, RF aerogels are typically dark red or black in color, and substantially transparent. The next step in organic aerogel preparation is to dry the hydrogel sol. If the polymerization solvent is removed from these gels by simple evaporation, large capillary forces are exerted on the pores, forming a collapsed structure, i.e., aerogel. In order to preserve the gel skeleton and minimize shrinkage, it is preferable to perform the drying step under supercritical conditions (described hereinafter). Other drying steps may also be conducted, if desired, usually before the supercritical extraction step. For example, it is common to conduct a solvent exchange step where the cured hydrogel is contacted with an exchange solvent, e.g., acetone, to form a dried aerogel, prior to subjecting the dried aerogel to supercritical extraction, because water is immiscible with liquid carbon dioxide, a common supercritical fluid. Also, as an alternative, or in addition, to the exchange step, surfactants may be used to remove water from the cured hydrogel. The highly porous material obtained from this removal operation is the organic aerogel. By appropriate adjustment of drying conditions, a hybrid structure having characteristics of both a aerogel and an aerogel may be produced. For example, such a hybrid may be produced as a result of a partial evaporation of the gel solvent under conditions promoting aerogel formation followed by evaporation of the remaining solvent under conditions promoting aerogel formation. The resulting hybrid structure would then be dried under supercritical conditions and pyrolyzed. Preparation of other aerogel-aerogel hybrids may be produced by first evaporating under conditions promoting aerogel formation and completing the evaporation under aerogel-promoting conditions.

As noted above, one means for removing water from the hydrogel to form an organic aerogel is by extraction of the gel under supercritical conditions. As used herein, a "supercritical fluid" (also referred to in the art as "supercritical solution" or "supercritical solvent") is one in which the temperature and pressure of the fluid are greater than the respective critical temperature and pressure of the fluid. A supercritical condition for a particular fluid refers to a condition in which the temperature and pressure are both respectively greater than the critical temperature and critical pressure of the particular fluid.

A "near-supercritical fluid" is one in which the reduced temperature (actual temperature measured in Kelvin divided by the critical temperature of the solution (or solvent) measured in Kelvin) and reduced pressure (actual pressure divided by critical pressure of the fluid) of the fluid are both greater than 0.8 but the fluid is not a supercritical fluid. A near-supercritical condition for a particular fluid refers to a condition in which the reduced temperature and reduced pressure are both respectively greater 0.8 but the condition is not supercritical. Under ambient conditions, the fluid can be a gas or liquid. The term fluid is also meant to include a mixture of two or more different individual fluid. As used herein, the term "supercritical fluid" and "supercritical conditions" are intended to include near supercritical fluids and near supercritical conditions respectively.

The temperature and pressure of the extraction process depend on the choice of supercritical fluid. Generally, the temperature is less than 250 C. and often less than 100 C., while the pressure is typically between 50 to 500 atm.

Solvents that can be used as supercritical fluids are well known in the art and are sometimes referred to as dense gases (Sonntag et al., Introduction to Thermodynamics, Classical and Statistical, 2nd ed., John Wiley & Sons, 1982, p. 40). Suitable solvents for use as a supercritical fluid include, for example, carbon dioxide, ethane, propane, butane, pentane, dimethyl ether, ethanol, water and mixtures thereof. Carbon dioxide is a preferred supercritical fluid for use in accordance with the present invention. For example, at 333K and 150 atm, the density of $CO_2$ is 0.60 $g/cm^3$; therefore, with respect to $CO_2$, the reduced temperature is 1.09, the reduced pressure is 2.06, and the reduced density is 1.28. Carbon dioxide is a particularly good choice of supercritical fluid. Its critical temperature (31.1 C.) is close to ambient temperature and thus allows the use of moderate process temperatures (<80 C.). The time required for supercritical drying depends on the thickness of the gel. Further details concerning the selection of suitable supercritical fluids and extraction conditions are known to those skilled in the art, see e.g., McHugh et al, Supercritical Fluid Extraction: Principles and Practice; Butterworths: Boston, 1986).

In cases where the cured hydrogels are of sufficiently high density, such as greater than about 40 wt % solids, the pore network may have sufficient inherent strength to withstand the drying process without resort to supercritical drying conditions. Thus, carbon dioxide may be bled from the vessel under nonsupercritical conditions. Nonsupercritical drying is particularly attractive because of reduced processing time. To maximize crosslinking and further increase the density of the gels, a cure cycle may be desired.

Following the solvent exchange/extraction step and any cure cycle, the organic aerogel is typically pyrolyzed at elevated temperatures of about 400 C. to 2000 C., typically in a conventional inert atmosphere of nitrogen, argon, neon or helium to form a pyrolyzed aerogel, e.g., carbon aerogel. The pyrolysis temperatures can alter the surface area and structure of the pyrolyzed aerogel. In particular, higher surface areas are achieved at lower temperatures. The resulting aerogels, independent of the procedure by which they are pyrolyzed, are black and not transparent due to the visible absorption properties of the carbon matrix.

The aerogels of the present invention typically have a surface area of from about 100 to 2000 meters squares per gram {"$m^2/g$"), a pore volume of from about 0.5 to 10 cubic centimeters per gram ("$cm^3/g$"), and a density of from about 0.01 to 2.0 grams per cubic centimeter ("$g/cm^3$"). Such properties can be readily determined by those skilled in the art. For example, surface area and pore volume can be determined by the BET method, S. Brunauer, P. H. Emmett and E. Teller, J. Am. Chem. Soc. 60, 309 (1938) and density can be determined by using a pyrometer, the details of which are known to those skilled in the art.

The amount of the aerogel in the metallic aerogel compositions of the present invention is typically from about 20 to 99.9 wt %, more typically from 40 to 99 wt % and often from about 50 to 90 wt %, based on the total weight of the composition, i.e., total solids (metallic particle plus aerogel exclusive of any liquids). The amount of the metallic particle in the metallic aerogel compositions of the present invention is typically from about 0.1 to 80 wt %, more typically from about 1 to 60 wt % and often from about 10 to 50 wt %, based on the total weight of the composition.

The particular metallic particles used in the compositions of the present invention are not critical. The metallic particles may be in the form of free metal, i.e., zero valence, or ionic, e.g., in the form of a metallic compound. Examples of suitable metals include typical metals used in catalysts, although the invention is not limited to particular metals. Typical metals include iron, cobalt, magnesium, nickel, titanium, chromium, copper, platinum, gold, silver, rhodium, ruthenium, palladium, iridium, and the like. Preferred metals include platinum, rhodium, palladium, iridium, silver, gold and mixtures thereof.

Preferably, the metallic compound (precursor) is provided in the form of an organometallic compound. Typically, the organometallic compounds comprise a transition metal bound to one or more organic ligands. Some examples of useful organometallic compounds contain the following classes of ligands: beta-dilettantes (e.g., $Cu(hfac)_2$ or $Pd(hfac)_2$, where hfac is an abbreviation for 1,1,1,5,5,5-hexafluoroacetylacetonate), alkyls (e.g., $Zn(ethyl)_2$ or dimethyl(cyclooctadiene)platinum(II) $(CODPtMe_2)$), allyls (e.g. bis (allyl)zinc or $W(\pi^4\text{-allyl})_4$), dienes (e.g., $CODPtMe_2$), or metallocenes (e.g., $Ti(\pi^5\text{-}C_5H_5)_2$ or $Ni(\pi^5\text{-}C_5H_5)_2$). Preferred organometallic compounds include dimethyl(cyclooctadiene)platinum(II), tetraamine platinum (II) chloride, platinum(II)hexafluoroacetylacetone, (trimethyl)methylcyclopentadienylplatinum(IV), bis(cyclopentadienyl)ruthenium, bis(ethylcyclopentadienyl)ruthenium(II), bis(pentamethylcyclodienyl)ruthenium, (methylcyclopentadienyl)(1,5-cyclooctadiene)iridium(I), and mixtures thereof. For a list of additional potential organometallic compounds, see for example, M. J. Hampden-Smith and T. T. Kodas, Chem. Vap. Deposition, 1:8 (1995). Further details concerning the selection of suitable organometallic compounds to make the desired aerogel compositions are known to those skilled in the art. Such materials are commercially available.

In accordance with the present invention, the metallic particles have an average particle size of about 4 nanometers or less, based on the number of metallic particles. Typically, the average particle size of the metallic particles is about 3 nanometers or less, preferably from 1 to 2 nanometers and more preferably about 1 nanometer. As used herein, the term "average particle size" means the average diameter (also referred to in the art as "effective diameter"). A preferred technique for measuring the average particle size is to measure the diameter of a representative number of particles from an electron micrograph, e.g., from a transmission electron microscope ("TEM") and calculate an average. Another method is hydrogen or CO chemisorption where the total metal surface area is measured. This information can then be used to calculate an average metal diameter. Further details concerning techniques for measuring the average particle size of the metallic particles are known to those skilled in the art.

Furthermore, in accordance with the present invention it is not necessary to include a reaction reagent to promote the deposition of the metallic compound onto the surface of the aerogel, such as required in chemical vapor deposition or chemical fluid deposition processes, e.g., $H_2$, $H_2S$, $O_2$ or $N_2O$. Preferably in accordance with the present invention, the metallic compound is deposited in the substantial absence a reaction reagent (of the metallic compound). Preferably, the supercritical fluid containing the metallic compound comprises less than 5 wt %, more preferably less than 1 wt % and most preferably less than 0.1 wt % of a reaction reagent, based on the total weight of the supercritical fluid, reaction reagent and metallic compound. Preferably, in accordance with the present invention there is no chemical change to the metallic compound during the supercritical deposition of the metallic compound onto the aerogel surface. As described hereinafter, when a chemical change is desired, e.g., reduction with hydrogen, it is not conducted until after the metallic compound is deposited onto the aerogel.

Quite surprisingly in accordance with the present invention, it has been found that the aerogel compositions can have a very narrow particle size distribution of the metallic particles. Typically, when the metallic particles have an average particle size of about 4 nanometers or less, less than about 20% of the metallic particles have a particle size of about 5 nanometers or greater, based on the number of metallic particles. Typically, when the metallic particles have an average particle size of about 3 nanometers, less than about 20% of the metallic particles have a particle size of about 4 nanometers or greater and less than about 20% of the metallic particles have a particle size of about 2 nanometers or less. Typically, when the metallic particles have an average particle size of about 2 nanometers, less than about 20% of the metallic particles have a particle size of about 3 nanometers or greater and less than about 20% of the metallic particles have a particle size of about 1 nanometer or less. Preferably, less than about 20% of the metallic particles have a particle size of about 3 nanometers or greater and less than about 20% of the particles have a particle size of less than about 1 nanometer. More preferably, when the metallic particles have an average particle size of about 1 nanometer, less than about 20% of the metallic particles have a particle size of about 2 nanometers or greater and less than about 20% of the metallic particles have a particle size of less than about 1 nanometer, based on the number of metallic particles. The particle size distribution can readily be determined by generating a histogram of the particle sizes from the TEM micrographs described above.

In accordance with a preferred aspect of the invention, there is provided a process for making a metallic aerogel composition, comprising contacting an aerogel with a supercritical fluid comprising a metallic compound. The concentration of the metallic compound should be sufficient to provide the desired amount of the metallic particle dispersed within the aerogel.

In another aspect of the invention, the metallic compound can be added along with the reactants, e.g., monomers, in the preparation of the hydrogel sot. This can be conducted in addition to, or instead of the, the contacting of the aerogel with a supercritical fluid comprising a metallic compound. In still yet another aspect of the invention, the metallic particle can be impregnated into the surface of the aerogel by techniques known to those skilled in the art.

The metallic aerogel compositions can be used with the metal present in an ionic state or in the free metal state. If the free metal state is desired, the metal in ionic form can be reduced by any method known to those skilled in the art, e.g., by conducting a second pyrolysis step, e.g., at a temperature of from about 50° to 2000° C., or by contacting the metallic aerogel composition with a reduction gas such as, for example, hydrogen, to form a reduced metal aerogel. Preferably, the metallic particles have a surface area of at least about 50 $m^2/g$, preferably at least about 100 $m^2/g$, more preferably at least about 200 $m^2/g$, and most preferably at least about 300 $m^2/g$.

In one preferred aspect of the invention, there is provided a process for making a metallic aerogel composition, comprising:

polymerizing at least two monomers in a liquid medium to form a polymerization product comprising a hydrogel sol and the liquid medium;

curing the hydrogel sol to form a cured hydrogel;

removing at least a portion of the liquid medium from the cured hydrogel to form an organic aerogel;

pyrolyzing the organic aerogel to form a pyrolyzed aerogel; and contacting the pyrolyzed aerogel with a supercritical fluid comprising a metallic compound to form a metallic aerogel.

In another preferred aspect of the invention, there is provided a process for making a metallic aerogel composition, comprising:

polymerizing at least two monomers in a liquid medium to form a polymerization product comprising a hydrogel sol and the liquid medium;

curing the hydrogel sol to form a cured hydrogel;

optionally removing at least a portion of the liquid medium from the cured hydrogel to form a dried aerogel;

contacting the dried aerogel or the cured aerogel with a first supercritical fluid to form an organic aerogel;

pyrolyzing the organic aerogel to form a pyrolyzed aerogel; and optionally contacting the pyrolyzed aerogel with a second supercritical fluid to form a metallic aerogel;

characterized in that at least one of said first supercritical fluid or said second supercritical fluid comprises a metallic compound.

Thus, in accordance with this aspect of the present invention, either the first supercritical fluid or the second supercritical fluid, or both, comprises the metallic compound.

The processes of the present invention may comprise further steps as desired. For example, a preferred aspect of the invention further comprises the step of contacting the metallic aerogel with a polymer electrolyte, e.g, Nafion™ Solutions, a polymer electrolyte available from E. I. duPont de Nemours and Company, Wilmington, Del. as a 5% solution of perfluorosulfonic acid/PTFE copolymer in the (H+) form. Preferably, the contacting is conducted after incorporation of the metallic particles into the aerogel.

The particular form of the compositions of the present invention is not critical. Typical forms include particles, extrudate, pellets, films, coatings, fibers and the like. Likewise, the compositions of the present invention can have a variety of end uses such as, for example, for use in fuel cell electrodes, as catalysts for chemical reactions, e.g., hydrogenation or dehydrogenation, oxidation, isomerization, reforming, hydrocracking, polymerization, etc. Use of the compositions of the present invention as fuel cell electrodes, e.g., PEM electrodes, is especially preferred.

Certain preferred aspects of the present invention are exemplified as follows.

One exemplification of the present invention for producing platinum loaded carbon aerogels includes placing a platinum precursor (for example, $Pt(NH_3)_4(Cl_2)$ into a solution together with resorcinol, formaldehyde and sodium carbonate. Resorcinol and formaldehyde polymerize and thereafter cured. Water is then extracted from the matrix using acetone. Subsequent supercritical carbon dioxide extraction of acetone results in a platinum complex uniformly distributed in an organic resorcinol-formaldehyde (RF) aerogel matrix. The matrix is subsequently subjected to pyrolysis under a nitrogen atmosphere resulting in a carbon aerogel loaded with platinum metal.

The curing time of the RF aerogels can be decreased by carrying out the curing in the temperature range of from about 50-200° C., preferably from about 100-200° C., and more preferably from about 110-140° C., by conducting the process, for example, in glass lined steel vessels under pressure greater than 1 atm, e.g., 1 to 5 atm. Moreover, surfactants may be used to remove the water directly from RF aerogels without the need for acetone exchange.

Another exemplification of the present invention for producing platinum loaded carbon aerogels includes contacting an RF aerogel sample with a super critical $CO_2$ solution containing a platinum precursor (for example, CODpt $(CH_3)_2$) dissolved therein. The platinum precursor is adsorbed onto the aerogel. Hydrogen is then used to reduce the platinum precursor to platinum metal. The RF aerogel is then depressurized and subjected to pyrolysis resulting in a carbon aerogel loaded with platinum metal.

In this exemplification, instead of using hydrogen to reduce the platinum precursor to a platinum metal, the RF aerogel may be depressurized and then subjected to pyrolysis under a nitrogen atmosphere. The platinum metal results due to the thermal reduction of the platinum precursor.

Another exemplification of the present invention includes impregnating a carbon aerogel with a platinum precursor (for example, $CODptMe_2$). The platinum precursor is converted to a finely dispersed platinum metal within the aerogel matrix by pyrolyzing under a nitrogen atmosphere. The atmosphere can also be a mixture of hydrogen with any inert gas.

Another exemplification of the present invention includes a silica aerogel impregnated with an organometallic complex containing platinum (Pt) using supercritical carbon dioxide ($scCO_2$) as solvent medium.

Preparation conditions such as reactant (monomer) concentrations, curing times and temperatures, impregnation conditions, pyrolysis temperatures and pressures can all be changed appropriately to control the properties of the resulting materials. For example, it was realized that platinum loaded RF aerogels prepared using the method according to the second exemplification turned black while degassing at 200° C. This indicated that platinum was acting as a catalyst in the pyrolysis. Therefore, in accordance with the present invention, substantially lower pyrolysis temperatures may be employed. This is important in the incorporation of the aerogels into other materials such as membranes which often do not survive the usual high pyrolysis temperatures.

The invention is hereafter described with respect to the examples which are not intended to limit the scope of the claims which follow.

EXAMPLE 1

Preparation of RF Aerogels

The RF aerogels were synthesized by the reaction of resorcinol with formaldehyde. For each run, 2 grams ("g") of resorcinol was dissolved in 2.38 g of water in a test tube. Subsequently, 0.019 g of sodium carbonate and 2.95 g of formaldehyde solution were added.

The tube was then sealed by a rubber stopper and the contents mixed by shaking. The tube was kept at room temperature for one (1) day, at 50° C. for one (1) day and at 90° C. for three (3) days. At the end of the first day, the solution in the tube gelled and had a yellow-orange color. The gel progressively became darker during the curing period and was dark red-black in the end. At the end of the 90° C. period, the monolith was taken out of the test tube and immersed in approximately 200 milliliters ("ml") acetone. There it was kept for a period of two (2) days. Subsequently, acetone was extracted supercritically.

Supercritical carbon dioxide extraction was conducted using a high-pressure vessel (internal volume of 54 cm$^3$), custom manufactured from 316 stainless steel and equipped with two sapphire windows (diameter=1.25", thickness=0.5"), sealed on both sides with poly(ether ether ketone) ("PEEK") seals.

In a typical experiment, the vessel was filled with acetone and the monolith was placed in the vessel. The vessel was charged very slowly with $CO_2$ from a syringe pump (ISCO, Lincoln, Nebr., Model 260D). The vessel was connected to a back pressure regulator which kept the system pressure at 200 bars. The acetone was displaced by liquid $CO_2$ as evident by the transformation from a two phase to a single phase system. The vessel was then heated to the desired temperature, 50° C., by a recirculating heater/cooler (Fisher) via a machined internal coil.

Extraction was continued for a period of around four (4) hours until no acetone could be detected in the effluent stream. This process usually took approximately 400 g of $CO_2$. The temperature was controlled during each experiment with a variation of 0.5° C. The pressure was measured using a pressure transducer (Omega Engineering, Stamford, Conn., Model PX01K1-5KGV). At the end of the extraction period, the vessel was slowly depressurized at 50° C. Depressurization took approximately three (3) hours.

Once the depressurization was complete, the vessel was opened and the monolith removed as RF aerogel. It weighed 2.9 g (theoretical yield=3.09 g) indicating that almost all of the resorcinol and formaldehyde polymerized and very little weight loss occurred during processing. The shape and volume of the monolith was conserved during the extraction and depressurization process.

The properties of the RF aerogel were investigated by BET nitrogen adsorption. Part of the aerogel was crushed into a powder and analyzed. Part of it was broken down into large pieces and one of the pieces was analyzed. The BET surface area (SA) and pore size distribution of RF and carbon aerogels (CA) were obtained from at least ninety (90) point nitrogen adsorption/desorption analysis with a Micromeritics ASAP 2010 instrument. All samples were outgassed at 100° C. (for RF) and 200° C. (for CA) prior to any adsorption-desorption measurements. BET SA was calculated from the linear part of the BET equation over the relative pressure range of 0.03 to 0.30. Pore size distributions were derived from the incorporated software of the instrument using the Barrett, Joyner and Halenda ("BJH") method, the details of which are known to those skilled in the art.

Powder Form:

| | |
|---|---|
| BET Surface Area: | 888 $m^2/g$ |
| Pore Volume: | 1.24 $cm^3/g$ |
| Average Pore Diameter: | 5.5 nanometers ("nm") (from BJH desorption) |

Large Piece Form:

| | |
|---|---|
| BET Surface Area: | 873 $m^2/g$ |
| Pore Volume: | 1.49 $cm^3/g$ |
| Average Pore Diameter: | 6.3 nm (from BJH desorption) |

The data indicate that the pore structure stayed substantially intact when crushed. There seems to be a light decrease in the pore volume and average pore diameter upon crushing. The shapes of the hysteresis loops for both crushed and uncrushed samples are Type E.

EXAMPLE 2

Acetone—Water Exchange

To investigate the effect of immersion time in acetone, 3 monoliths were prepared using the procedure and reactant compositions given above in Example 1. One sample was left for one (1) day, one sample was left for two (2) days and one sample was left for five days in an acetone bath followed by a one hour sonication in fresh acetone. Subsequently, acetone was extracted from the samples using supercritical carbon dioxide as described above in Example 1.

After depressurization, the weights of the pellets ranged from 2.84 to 2.90 g indicating that immersion time in acetone had no effect on the amount of water displaced. It is believed that sonication of the samples in acetone accelerated the acetone-water exchange process dramatically.

EXAMPLE 3

Preparation of Carbon Aerogels

RF aerogels made in accordance with Example 1 were converted to carbon aerogels by pyrolysis in an inert nitrogen atmosphere. RF aerogel in monolithic form was placed in a quartz tube. The quartz tube was paced in a tubular oven. One end of the tube was connected to a nitrogen cylinder.

The flow rate of the nitrogen was controlled using a needle valve placed after the regulator. The other end of the tube was connected to a soap bubble meter to measure the flow rate of nitrogen. The flow rate of nitrogen was adjusted to 100 $cm^3/min$ and the oven was heated to 1000° C. under flowing nitrogen. The heating rate was approximately 5° C./min. The temperature inside the oven reached 1020° C. in approximately six (6) hours.

The oven was kept at this temperature for another five (5) hours. Subsequently, the oven was turned off and cooled overnight with nitrogen flowing. The material removed from the tube was black and its size appeared to have shrunk compared to the original material.

Large Piece Form:

| | |
|---|---|
| BET Surface Area: | 741 $m^2/g$ |
| Pore Volume: | 0.77 $cm^3/g$ |
| Average Pore Diameter: | 3.4 nm (from BJH desorption) |

The analysis indicates that loss of surface area was not significant during pyrolysis. However, the pore volume decreased and the average pore diameter also decreased in accordance with the volume contraction observed.

EXAMPLES 4-11

Effect of Reactant Concentrations on the Properties of Aerogels:

To investigate the effects of concentrations of the reactants and catalyst on the properties of the aerogels, a variety of solutions were prepared and processed as explained above. The characteristics of the aerogels are shown in Table 1.

TABLE 1

Effect of Reactant Composition on Properties of Aerogels

| Example | | | BET SA | Average Pore Diameter nm | | Pore Volume |
|---|---|---|---|---|---|---|
| No. | R/C | R/W | $m^2/g$ | BET | BJH | $cm^3/g$ |
| 4-$C_{12}$RF | 99.1 | 0.08 | 888.6 | 5.6 | 5.5 | 1.24 |
| 5-$C_{12}$CA | 99.1 | 0.08 | 741.2 | 4.1 | 4.3 | 0.78 |

TABLE 1-continued

Effect of Reactant Composition on Properties of Aerogels

| Example | | | BET SA | Average Pore Diameter nm | | Pore Volume |
|---|---|---|---|---|---|---|
| No. | R/C | R/W | m²/g | BET | BJH | cm³/g |
| 6-C$_{13}$RF | 50.0 | 0.08 | 864.0 | 5.3 | 4.5 | 1.1 |
| 7-C$_{13}$CA | 50.0 | 0.08 | 682.4 | 3.1 | 3.2 | 0.52 |
| 8-C$_{11}$RF | 91.2 | 0.04 | 765.4 | 11.0 | 9.9 | 2.10 |
| 9-C$_{11}$CA | 91.2 | 0.04 | 723.4 | 8.6 | 7.9 | 1.55 |
| 10-C$_{49}$RF | 200.0 | 0.02 | 636.7 | 19.3 | 20.7 | 3.03 |
| 11-C$_{49}$CA | 200.0 | 0.02 | 629.2 | 16.5 | 17.1 | 2.63 |

EXAMPLE 12

Impregnation of Platinum on Aerogel

RF aerogels made in accordance with Example 1 were impregnated with an organometallic complex containing platinum which was subsequently reduced to platinum metal and carbon aerogel by pyrolysis.

0.8 g RF aerogels (2 pieces) was placed in the vessel described above in Example 1 together with finely ground 0.150 g dimethyl(cyclooctadiene)platinum (II) (CODPtMe$_2$). The vessel was heated to 80° C. and charged with carbon dioxide to 2250 psig. The system was depressurized after 6 hours and weighed 0.85 g indicating that 50 milligrams ("mg") of the Pt complex had adsorbed on the RF aerogel. The RF aerogel pieces were pyrolyzed as described in Example 3 resulting in 0.42 g of platinum loaded carbon aerogel. The estimated platinum content was 7 wt %.

The sample was also characterized for its platinum content. The sample was first digested with nitric and hydrochloric based on Method EPA 3010. Subsequently, the samples were put in a hot block for about four (4) hours and then the solution was analyzed by Inductively Coupled Mass Spectrometry (Perkin Elmer, Norwalk, Conn., Model OPTIMA 3300 XL, with AS 91 Autosampler, based on EPA Method 6010B. The sample had a platinum content of 5.6 wt %, which is close to the value calculated gravimetrically.

EXAMPLE 13

Metallic Compound Added to Sol 2 g of resorcinol was dissolved in 1.5 g of water in a test tube. To this solution, 0.019 g of sodium carbonate was added and the tube was shaken until clear solution was obtained. In a separate vial, 0.05 g of tetraamine platinum (II) chloride, Pt(NH$_3$)$_4$Cl$_2$ was dissolved in 1.18 g water and the solution was added to the tube. The tube was sealed by a rubber stopper.

The tube was kept at room temperature for one (1) day, at 50° C. for one (1) day and at 90° C. for three (3) days. At the end of the first day, the solution in the tube gelled and had a brownish color. After three days at 90° C., the tube was taken out of the oven and cooled. The monolith had an orange color and there was no weight loss. The monolith was immersed in an acetone bath for two days. After sonication in fresh acetone for one hour, acetone was extracted by scCO$_2$ as described above. The platinum loaded RF aerogel was pyrolyzed as described above in Example 3 giving platinum loaded carbon aerogel. The results of the BET analysis and hydrogen chemisorption studies are given below:

Powder Form:

| | |
|---|---|
| BET Surface Area: | 545 m²/g |
| Pore Volume: | 1.34 cm³/g |
| Average Pore Diameter: | 20.5 nm |

Hydrogen Chemisorption:

Metal Dispersion: 31% based on the original amount of platinum placed into the sol Metallic Surface Area: 0.79 m²/g sample

EXAMPLE 14

Metallic Compound Added to Sol 2 g of resorcinol were dissolved in 1.5 g of water in a test tube. To this solution, 0.019 g of sodium carbonate was added and the tube was shaken until a clear solution was obtained. In a separate via, 0.05 g of potassium tetrachloroplatinate was dissolved in 1.18 g of water and the solution was added to the tube. The tube was sealed by a rubber stopper. The tube was kept at room temperature for one (1) day, at 50° C. for one (1) day and at 90° C. for three (3) days. At the end of the first day, the solution in the tube gelled and had a brownish color. After three days at 90° C., the tube was taken out of the oven and cooled. The monolith had an orange color and there was no weight loss. The monolith was immersed in an acetone bath for two days. After sonication in fresh acetone for one hour, acetone was extracted by supercritical CO$_2$ as described above and the sample pyrolyzed.

EXAMPLE 15

Platinum Deposition on Aerogel with Carbon Dioxide

A carbon aerogel prepared as described above in Example 3 was broken down into small pieces and 1.229 g of small pieces of carbon aerogel, 250 mg of finely ground dimethyl (cyclooctadiene)platinum (II)(CODPtMe$_2$) and a magnetic stir bar were put into a 50 ml high pressure vessel equipped with a rupture disk assembly, 2 sapphire windows and a pressure transducer. The vessel was placed on a magnetic stirrer and was heated to 80° C. and charged with carbon dioxide to 4000 psig. The vessel was kept at these conditions for a period of 24 hours. After 24 hours, the vessel was depressurized and CODPtMe$_2$ loaded carbon aerogel was removed out of the vessel. It weighed 1.449 g indicating that 220 mg of the precursor was adsorbed into the carbon aerogel.

EXAMPLE 16

Reduction of Platinum 593.2 mg of the CODPtMe$_2$ loaded carbon aerogel of Example 15 was placed in a quartz tube and heated to 350° C. under flowing nitrogen in a furnace such as used for pyrolysis in Example 3. It was kept at 350° C. for a period of 6 hours. During this period, CODPtMe$_2$ was converted to platinum metal. Subsequently, the furnace was turned off and the tube was allowed to cool under flowing nitrogen. The pieces of platinum loaded carbon aerogels were removed from the tube and crushed into particles. Analysis of the particles by TEM indicated the presence of uniformly distributed small Pt crystallites with an average size of 1 nm within the carbon aerogel matrix.

Additional samples were prepared in accordance with the procedures set forth in Examples 15 and 16, the results of which are set forth in Table 2, below.

TABLE 2

Properties of Platinum Loaded Carbon Aerogel Particles

| Sample | R/C | R/W | R/F | Pt Loading wt (%) | Pt Size (nm) |
|---|---|---|---|---|---|
| 16a-$C_{69}$B | 100 | 0.08 | 0.5 | 13 | NA |
| 16b-$C_{30}$ | 100 | 0.08 | 0.5 | 18 | 2 |
| 16c-$C_{45}$ | 100 | 0.08 | 0.5 | 20 | 2 |
| 16d-$C_{48}$ | 100 | 0.08 | 0.5 | 30 | 3 |
| 16e-$C_{12}$ | 100 | 0.08 | 0.5 | 12 | 1 |
| 16f-$C_{49}$ | 200 | 0.02 | 0.5 | 43 | NA |

The platinum particle size was determined using a Transmission Electron Microscope (TEM) (Model 2010, FAS JEOL).

EXAMPLE 17

Reduction of Platinum 614.1 mg of the $CODPtMe_2$ loaded carbon aerogel of Example 15 was placed in a quartz tube and heated to 500° C. under flowing nitrogen in a furnace such as used for pyrolysis in Example 3. It was kept at 500° C. for a period of 6 hours. During this period, $CODPtMe_2$ was converted to platinum metal. Subsequently, the furnace was turned off and the tube was allowed to cool under flowing nitrogen. The pieces of platinum loaded carbon aerogels were removed from the tube and crushed into particles. Analysis of the particles by TEM indicated the presence of uniformly distributed small Pt crystallites with an average size of 1.2 nm within the carbon aerogel matrix.

EXAMPLE 18

Platinum Loading on Silica Aerogel

Random sizes of silica aerogels were purchased from Marketech International, Inc., and the organic precursor, dimethyl(cyclooctadiene)platinum (II)($CODPtMe_2$), from STREM Chemicals and was used without any purification. The silica aerogel had a whitish tint and was transparent.

A certain amount of this monolithic aerogel (842.5 mg) was placed in a high-pressure vessel (internal volume of 54 cc), custom manufactured from 316 stainless steel and equipped with two sapphire windows (diameter=1.25", thickness=0.5"), sealed on both sides with PEEK seals, together with 374.6 mg of finely ground of the Pt precursor.

The vessel was heated to 80° C. and charged with carbon dioxide to 4000 psig. In approximately 2.5 hours, all of the $CODPtMe_2$ dissolved and was adsorbed into the aerogel. The vessel was kept at these conditions for 24 hours to ensure that adsorption equilibrium was achieved. The system was depressurized slowly for 3 hours at 60° C. and then cooled to room temperature. The sample was taken out of the vessel and weighed. The final weight was 1059.3 mg which corresponds to a 216.8 mg loading of the precursor (approximately 20 wt %). The aerogel composite was still intact and its color turned black but was still vaguely transparent indicating some conversion of the precursor to platinum metal under these conditions.

A chunk of this (804.4 mg) aerogel composite was placed in a quartz tube and then heated to 300° C. using a Thermolyne Tube Furnace (Model F21125) with flowing nitrogen gas at 100 ml/min for 6 hours. The aerogel was cooled to room temperature and weighed. The final weight was 736.0 mg which corresponds to 13% Pt loading, indicating the conversion of the precursor to the platinum metal was complete. The color of the composite was pitch black and color was uniform throughout. It was nontransparent but intact.

Those skilled in the art will recognize that the invention has been described with reference to specific aspects and that other aspects are intended to be within the scope of the claims which follow. For example, additional materials may be incorporated into the aerogel during its preparation, or incorporated into the aerogel after its formation, to achieve desired properties, e.g., electrical conductivity. In addition, unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the preferred methods and materials are described above. All publications, patent applications, patents, and other references mentioned herein are incorporated by reference in their entirety. In case of conflict, the present specification, including definitions, will control.

The invention claimed is:

1. A composition comprising an aerogel having a pore volume of at least 0.5 $cm^3$/g, as determined using a nitrogen adsorption/desorption technique or equivalent, and metallic particles dispersed on a surface of said aerogel such that said composition comprises at least 10 wt. % of metallic particles based on the total weight of the composition, wherein said metallic particles include platinum and wherein said metallic particles having an average particle diameter of about 2.5 nanometers or less.

2. The composition of claim 1, wherein said aerogel is a carbon aerogel.

* * * * *